Oct. 7, 1958 G. WHITE 2,855,469

LINE CHECKING DEVICES

Filed Aug. 10, 1953 4 Sheets-Sheet 1

INVENTOR.
GEORGE WHITE
BY [signature]
ATTORNEY

INVENTOR.
GEORGE WHITE
BY [signature]
ATTORNEY

Oct. 7, 1958 G. WHITE 2,855,469

LINE CHECKING DEVICES

Filed Aug. 10, 1953 4 Sheets-Sheet 3

INVENTOR.
GEORGE WHITE
BY Theodore Hayne
ATTORNEY

Oct. 7, 1958 G. WHITE 2,855,469

LINE CHECKING DEVICES

Filed Aug. 10, 1953 4 Sheets-Sheet 4

INVENTOR.
GEORGE WHITE

BY

ATTORNEY

United States Patent Office 2,855,469

Patented Oct. 7, 1958

2,855,469

LINE CHECKING DEVICES

George White, Newark, N. J.

Application August 10, 1953, Serial No. 373,430

8 Claims. (Cl. 179—175.2)

This invention represents a continuation in part of Serial No. 302,448, filed August 2, 1952, and relates to line checking and more particularly to a method and apparatus for checking a line with a minimum of current consumption or a minimum of disturbance in the line.

One of the objects of the invention is to permit transmission and reception of monitor's communications over a telephone line while it is being monitored or checked and without the knowledge of the actual owner of the line and to transfer such communications under control of the monitor from one telephone line to another line also without the owner knowing it.

A further object of the invention is to permit transmission and reception of audio communication over an existing telephone line and over a carrier frequency substantially lying above audio frequency range.

An additional object of the invention is to operate substantially automatically line checking or monitoring equipment under control of the sound or current itself carried over the line to be checked or monitored.

Another object of the invention is to detect line tampering or the existence of illegal or undesired line checking or monitoring operations.

Still further an object of the invention is a power supply for such a detection device which is substantially free from interference and can be operated from an existing A. C. line, thus making the line detection device portable.

Figure 1:
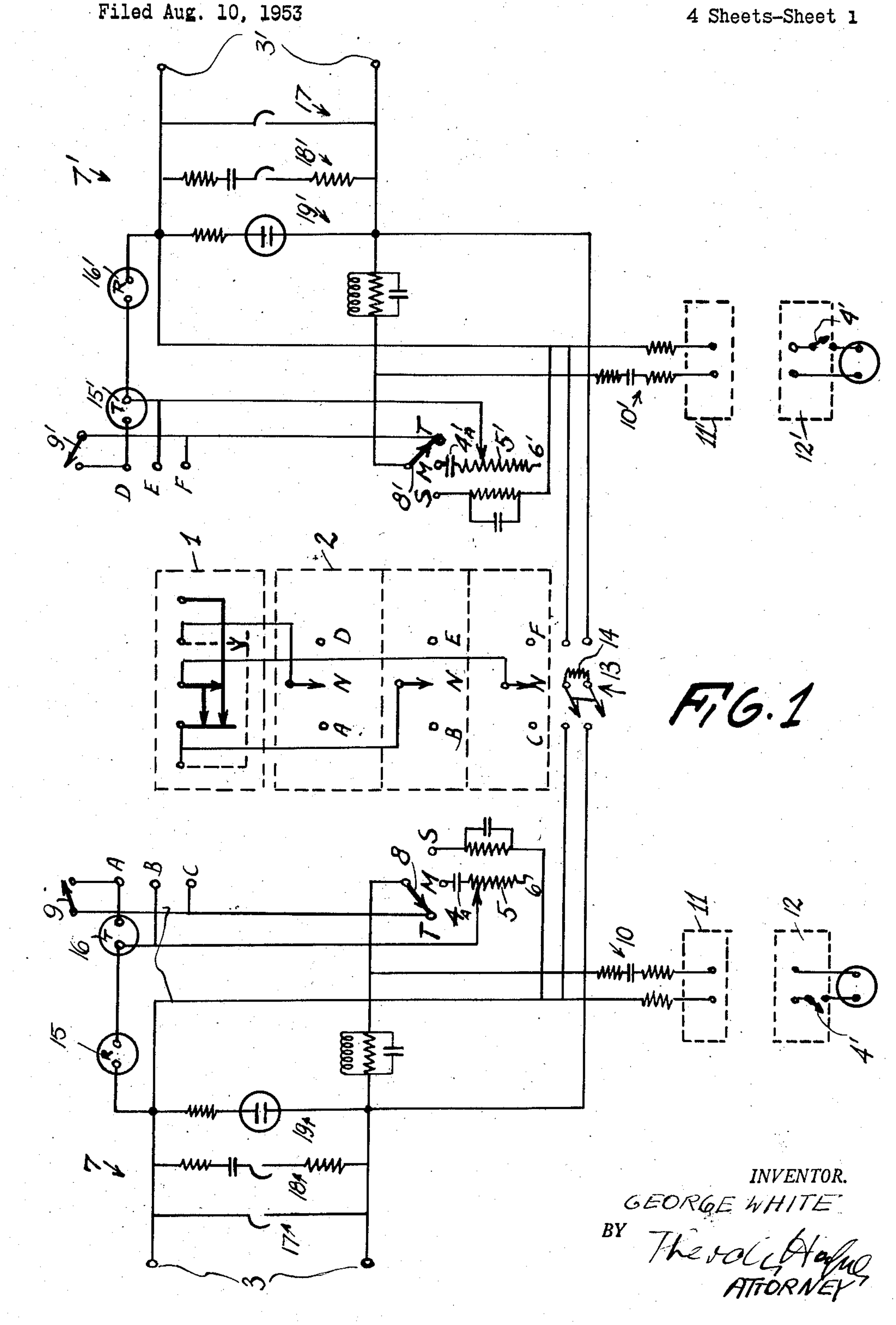
Fig. 1 represents a line bridging circuit for a plurality of telephone lines embodying certain features of the invention.

In Fig. 1, part 1 represents schematically a telephone dialing device which can be applied selectively by switch 2 either on telephone line 3 or on telephone line 3' but only on one line at a time, say line 3.

In order to switch dial device 1 out of a used telephone line in accordance with the invention, a hold switch is operated as schematically indicated at 4A. Switch 4A will place a holding circuit across line 3 permitting dial device 1 to be removed from line 3 and to be placed in a neutral position or switched over to another telephone line, such as shown at 3'.

Further in accordance with the invention, a blocking condenser 4, 4' is used to prevent the D. C. voltage from entering the circuit.

The value of condenser 4, 4' is so selected as to permit the circuit to have a low impedance or at least a low capacity reactance at speech frequencies.

Still further in accordance with the invention, a variable control impedance 5, 5' is used to reduce the charging rate of line blocking condenser 4, 4. Impedance 5, 5' consisting for example of a variable resistor is placed in series with blocking condenser 4, 4' and turned to its maximum position 6, 6' when one of the line bridging devices 7, 7' is placed across telephone line 3, 3', respectively. When control resistor 5, 5' is turned down, its resistance is reduced; this will allow about 89% of the line signals to pass over line bridge 7, 7' to the line receiving or monitoring device.

Control resistor 5, 5' operates in the following manner: When control resistor 5, 5' is at maximum position, the corresponding series resistance is quite considerable as stated above; when the control is slowly turned down to a predetermined point or resistance stop, condenser 4, 4' is being permitted to charge slowly. Such slow charging of condenser 4, 4' will not cause any disturbance in the telephone line to be examined, such as a click or a corresponding line pulse.

Part 8, 8' represents a two-pole three-position switch connecting in each bridging circuit 7, 7' telephone lines 3, 3' to positions T, M, S, respectively, involving "Talk," "Monitor," and "Short" operations.

Main switch 2 controls the connection of dial device 1 and permits the latter to be connected selectively over terminals A, B, C, to line bridge 7 and line 3, or over terminals D, E, F, to line bridge 7' and telephone line 3'; alternatively switch 2 may assume neutral position N.

Switch 9, 9' is a "Talk and Listen" switch and is used in case dial device 1 is switched out of line bridges 7, 7' and the operator prefers only to talk and/or to listen.

Switch 9, 9' does not function unless switch 8, 8' is in "T" or "Talk" position.

Line 10 permits monitoring by a second operator and permits this second operator to listen to one telephone line at a time only, or to two—or more as the case may be—telephone lines substantially simultaneously. The operator can switch out one line by the use of switch 4A and in this case all circuit functions remain substantially the same except that in the embodiment shown it is now necessary for line checking to use a high impedance headphone.

Part 11, 11' forms one portion of a four-prong plug cooperating with a corresponding socket portion 12, 12'. Connections 11, 12 and 11', 12' together with switch 4 permit the operator to select the telephone line or lines to which he wants to listen, singly or simultaneously.

Switch 13 is used to produce a selective holding circuit on the telephone line selected over positions A, B, C, or D, E, F, of switch 2 respectively.

Switch 13 connects holding impedance 14 and is adapted to hold only one telephone line at a time. It can be adapted to hold any number of lines without exceeding the scope of the invention.

Parts, 15, 16, 15', 16' represent receiving and transmitting terminals respectively adapted to be connected to transmitting and receiving apparatus used for the checking or monitoring of audio lines.

Terminals 17, 17' and 18, 18' permit measuring devices, headphones, recorders, etc. to be connected to line bridges 7, 7'. Terminals 19, 19' serve as connections for a holding circuit.

Figure 2:
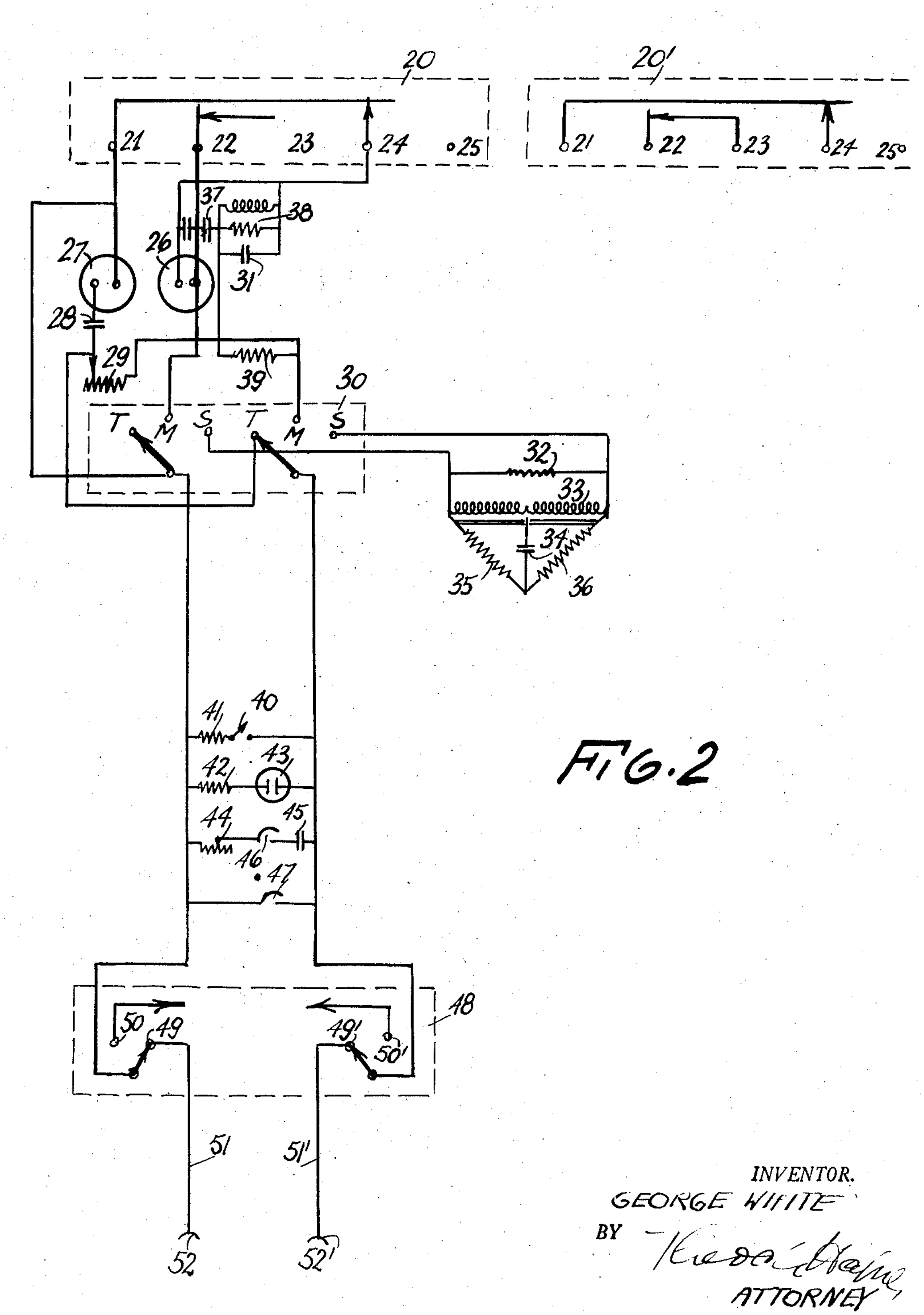
Fig. 2 represents a modified section of a bridging circuit such as shown in Fig. 1.

In Fig. 2, part 20 represents a dialing device with contacts 21, 22, 23, 24 and 25 in normal position, and part 20′, the same dialing device with contacts 21′ to 25′ in off normal position.

Part 26, 26′ represents transmitting terminals such as the microphone terminals of a complete head-set (not shown) and parts 27, 27′ the corresponding receiver or headphone terminals.

A blocking condenser 28 is connected in series with receiving terminals 27, and variable resistor 29 in series with blocking condenser 28 is used to prevent the latter from drawing a sudden and excessive amount of line current. At the time of connection resistor 29 is set at maximum position and thereafter gradually reduced in value to permit condenser 28 to operate substantially without any series resistance or with a predetermined amount of such series resistance.

Two-pole three-position switch 30 is adapted to assume one of three positions: "T" or "Talk" or "Dial" "M" or "Monitor" or "Listen"; and "S" or "Short Position" or "Fade-out of line."

Condenser 28 is used to reduce the sudden current pulse produced when switch 30 connects transceiver 26, 27 in and out of the line bridging circuit of Fig. 2.

A low ohm resistor 32 is placed across the telephone line to be monitored when switch 30 is in position "S." Resistor 32 is shunted by inductance 33 to quench the pulse caused at the moment when resistor 32 is connected across the line.

Inductance 33 will also cause a current lag which will subdue the pulse still further.

This action is enhanced by the use of a small condenser 34 and a pair of resistors 35, 36 connected to center and end terminals, respectively, of inductance 33 to produce a current lead. In this way together with the drop in the feedback potential due to the collapsing field in inductance 33, the connection click will be reduced if not cancelled out.

Resistors 35, 36 limit the charging rate of condenser 34. As a result a fade-out is caused to occur in the line rather than a sharp cut-off which would be noticeable.

Condenser 37 forms part of a filter designed to eliminate the dial click generated when dial device 20, 20′ is operated.

Reactance filter 38 aids in suppressing side talk which can be present when the line is actually occupied or busy.

Resistor 39 can be used in series with dial device 20, 20′ and transmitter 26 to limit the current flow in the line bridge when it is shunted into the telephone line for monitoring operations.

Switch 40 controls a holding circuit including inductively wound resistor 41.

Resistor 42 is in series with neon indicator lamp 43. Resistance 44 serves to permit gradual discharge of blocking condenser 45 if circuit jack 46 is connected to a checking or monitoring device.

Circuit jack 47 permits a checking, monitoring or any other device to be connected directly to the line bridge.

Two-pole two-position switch 48 connects the line bridge and devices coupled thereat to telephone or receiver terminals 49, 49′ and 50, 50′ respectively, over shielded low loss radio frequency cables such as indicated at 51, 51′ and provided with clips 52, 52′ respectively.

Figure 3:
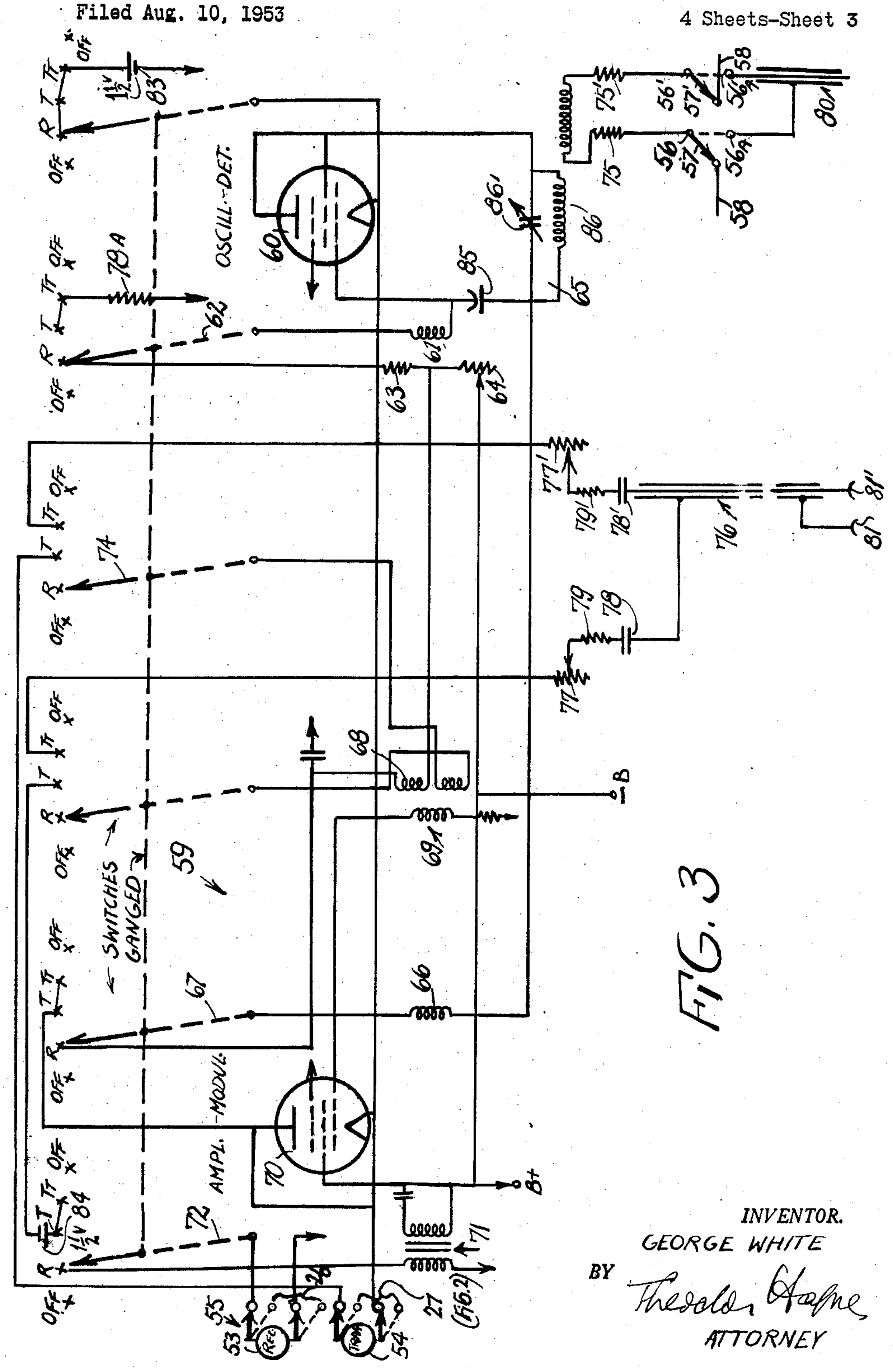
Fig. 3 represents another embodiment of the invention permitting secret transmission and reception of monitor's communications over telephone lines under monitor's examination.

In Fig. 3 receiver 53 and transmitter 54 can be connected selectively over switch 55 to terminals 26 and 27 respectively of the line bridge of Fig. 2, or as shown in Fig. 3 used in a transceiver circuit which is connected over terminals 56, 56′, switch 57, 57′ to lines 58, 58′.

Terminals 56, 56′ correspond for example to terminals 50, 50′ of Fig. 2.

Switch 55 is a four-pole two-position switch and is used to switch head-sets 53, 54 from one circuit to another.

Switch 59 is a six-pole five-position switch adapted to assume the following position:

"Off"—all circuits are in off position;
"R"—all circuits are in receive position;
"T"—all circuits are in transmit position;
"TT"—all circuits are in transmit second line position;
"Off"—all circuits are in off position.

Fig. 3 shows switch 59 in "R" or "Receive" position.

In this position of switch 59 the radio frequency signals transmitted over telephone line 58, 58′ are detected by tube 60 operating as a detector and having its control grid connected over radio frequency choke 61, switch arm 62, resistor 63, potentiometer 64 to B+ for regeneration control.

The output of detector tube 60 is applied over circuit 65, radio frequency choke 66, switch arm 67 and winding 68 of transformer 69 to the control grid of amplifier tube 70, the output of which is fed over a matched plate output transformer 71, switch arm 72 and switch 55 to the terminals of a receiver 63 consisting for example of a head phone.

In the transmitting position "T" of switch 59, tube 60 becomes an oscillator triode the output of which consists of a constant carrier frequency of say two megacycles, which is again connected over circuit 65, choke 66, switch arm 67 in position "T" and amplifier modulator tube 70 to winding 72 of transformer 69, while the other winding 73 of transformer 69 is applied from transmitter or microphone 54 to position "T" of switch arm 74. After amplification in tube 70, the oscillations are fed back over circuit 65 and resistors 75, 75′ to telephone line 58, 58′; the input terminals in this case also act as output terminals.

At the same time receiver or headphone 53 permits monitoring of the outgoing audio modulated radio frequency carrier waves.

In the fourth or TT position of switch 59, transmitter or microphone 54 is switched out and in its place audio signals are picked up directly from another telephone line as schematically indicated at 76 over charge and noise reducing potentiometers schematically indicated at 77, 77′ which also act as volume control and are connected in series with charge receiving condensers 78, 78′ and discharge reducing resistors 79, 79′ respectively.

In this way the risk that the line be monitored by an unauthorized person or switchboard operator is reduced if not eliminated; this is important in a large government office or for security departments requiring extreme privacy of the telephone lines.

The variable resistor controls in the line bridges permit the operator to break into and out of a telephone line to be monitored without causing any noticeable changes in the condition of the line such as audible noise or line loading.

This insures the operator of the monitoring equipment that the line will be monitored without being detected.

There again different operational possibilities will occur.

The line bridge section can be used: to monitor a line, to dial on a line, to hold a line, to cause fading or shorting of a line, or cause visual indication of line ringing.

A receiver transmitter structure in the form of a telephone head-set, otherwise well known in the telephone art, can be used in accordance with the invention with particular effect in a phone bridge of Fig. 1 or Fig. 2, or in combination with Fig. 3.

A transceiver such as shown in Fig. 3 can serve three purposes: as a receiver when a headphone is used to receive any message sent to it over the telephone line, as an audio transmitter when a microphone is used, or as a radio frequency transmitter when an input compensating circuit is connected to the transceiver transformer.

The device of Fig. 3 then operates in the following manner:

If used as a multiphone line bridge in connection with Fig. 2, switch 30 of Fig. 2 is placed in the "M" or "Monitoring" position and switch 40 is closed, i. e. placed into "Telephone" position. Similarly switch 48 of Fig. 2 is placed into "Telephone" position, i. e. connected to terminals 49, 49'. Tap controls 39, 39' of Fig. 2 are rotated to maximum position. Lead clips 52, 52' are placed across the telephone line to be monitored.

In case the monitoring operator desires to take up this conversation and send it over a telephone line which he has operating at this time to his central office, the following operations are executed:

Switch 48 of Fig. 2 is connected to terminals 50, 50'. Switch 48 of Fig. 2 corresponds to switch 57, 57' of Fig. 3. The leads of the line to the central office are connected to terminals 50, 50' and correspond in Fig. 3 to leads 58, 58' connected to terminals 56, 56'.

As to the particular circuit elements of Fig. 3 the following is noted:

Switch 57, 57' which selects either a line to be monitored or a telephone circuit for radio frequency communication, consists of a two-pole two-position switch.

Terminals 56, 56' connect to the line bridge, and terminals 56A, 56A' connect to the telephone circuit.

Bridge resistor 78A is used only when the unit is in "T" or "TT" positions.

Resistor 64 represents a variable regeneration control. Control resistors 77, 77' are ganged and both operate in series with each line and in series with resistors 79, 79' which are used in accordance with the invention to prevent the minimum resistance of this circuit from going below a predetermined value of resistance, say 500 ohms. This circuit is important because it is placed when used directly across a line bearing communications to be transmitted by the transceiver of Fig. 3. When such a line is used it will be possible for the monitoring operator to work without interfering with the line or its conversational contents. Blocking condensers 78, 78' are inserted in series with each leg of the line to prevent the Direct Current from entering the circuit.

Cables 76 and 80 are shielded low loss radio frequency cables so that outside frequencies or noises cannot be fed into the circuit of Fig. 3. Clip leads 81, 81' are used to snap onto a telephone line when desired. Similar clip leads (not shown) can be connected to low loss cable 80.

In the circuit of Fig. 3 two tubes 60, 70 are used. Tube 70 has its screen grid tied to the plate and is used as a triode oscillator and detector. Tube 60 forms an audio amplifier or modulator. Microphone 54 is connected in series with a single headphone 53 to produce side tones. Transformer 71 is used for proper impedance matching for tube 70 to headphone 53. When the transmitter is in operation the transformer secondary is open and the primary is used as a Heising modulation choke.

Bias for audio amplifier 70 is derived from the voltage drop across resistor 82.

As stated before regeneration is controlled by a single variable resistor 64 in the B+ circuit leading to detector 60 so that it is not required to provide an additional switch to reduce battery drain when the unit is not in operation.

A small 1½ volt battery is shown at 83, 84 respectively. Part 85 represents a plate to screen coupling condenser.

Output pentode amplifier 60 is of the battery operated type.

Coil 86 and tuning capacitor 87 make up the tuned tank circuit 64. This combination determines the working frequency for transmission.

Resistors 75, 75' and the primary 87 of tank circuit 64 determine a line loading or holding circuit. Under normal line condition it may not be practical to hold the line circuits closed without the aid of resistors 75, 75'. Without these resistors the primary winding of tank circuit 64 would be short circuited across the line and thus would shorten out the audio or telephone line connected thereto for monitoring. Resistors 75, 75' permit the operator to hold this line and transmit or receive while holding the line circuit closed.

The invention is not limited to the circuits and circuit elements shown and described in Fig. 3.

Switches can be replaced by relay tubes, transistors, and like relay elements of the electronic or electromechanical type. Transformers can be substituted by single resistive inductors, radio frequency networks and also by tubes, transistors, crystal detectors or the like electronic or electromechanical elements. Vacuum tubes can also be replaced by transistors, crystal diodes, radio frequency networks, transformers, and the like; variable line controls can be replaced by variable inductors, capacitors and also by suitable transistors, vacuum tubes or diodes, line matching transformers and other special input switching resistance determining circuits or circuit elements.

Figures 4, 5, 6, 7, 8:
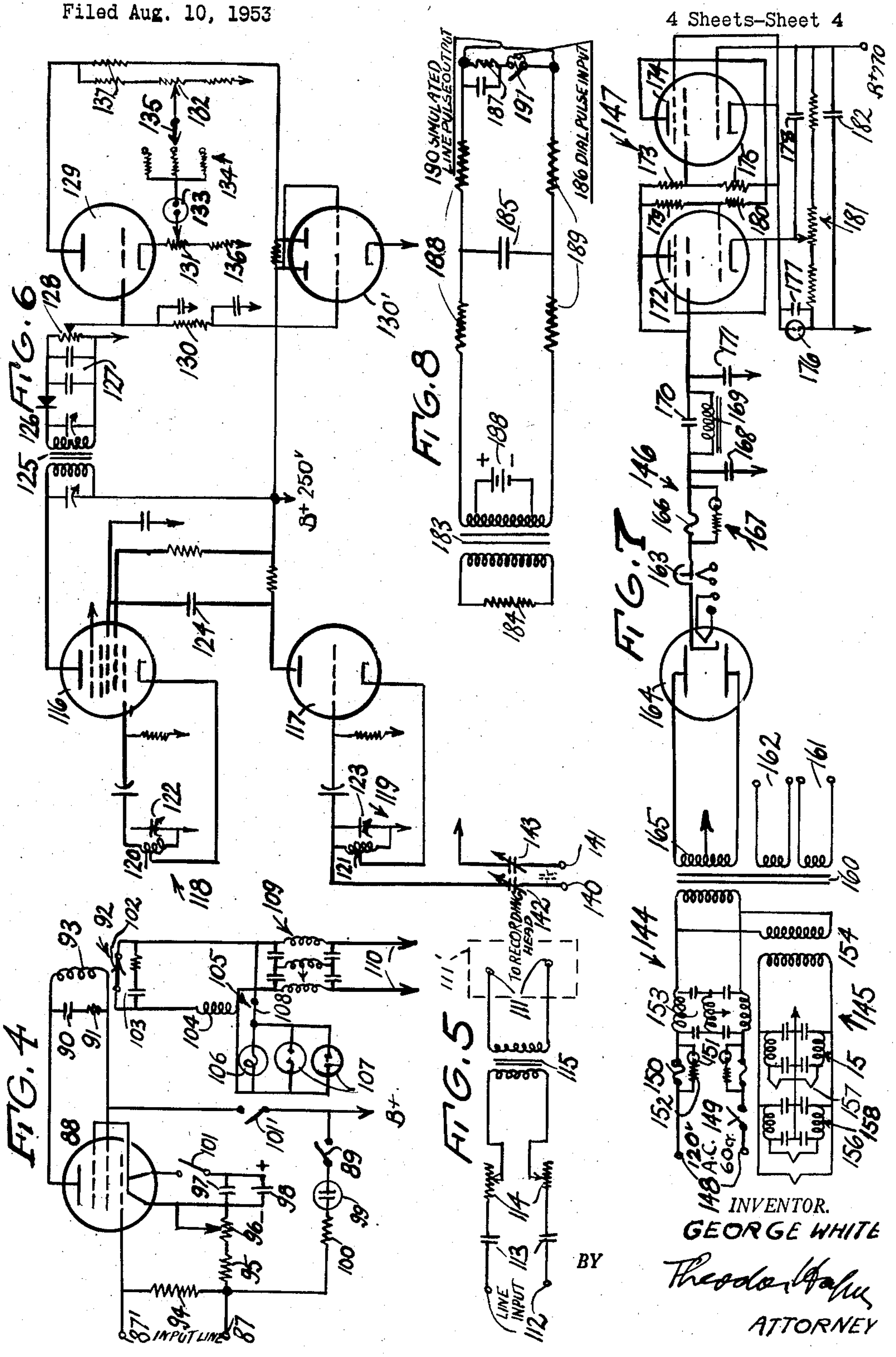
Figs. 4 and 5 represent an electronic switch controlling automatic connection of a line bridging circuit to permit checking or monitoring of telephone lines under control of the line currents themselves.
Figs. 6 and 7 represent respectively a portable detector and power supply for such detector for checking telephone or other audio lines as to the existence of tampering or undesired listening operations.
Fig. 8 represents a phantom circuit for imitating dial pulses as they occur in existing telephone lines to permit rapid checking of line bridging circuits, under operating conditions.

Fig. 4 shows an electronic switching circuit for automatically turning on recording or other monitoring equipment under control of signals derived from the line itself across terminals 87, 87' which for monitoring operation are to be connected for example to terminals 49, 49' of Fig. 2.

Tube 88 is an output pentode of the miniature type and under control of push button switch 89 serves to produce in an electrolytic condenser 90 and resistor 91 a holding circuit for relay 92 adapted to match the plate load requirements of tube 88.

Coil 93 of relay 92 will not close until the grid voltage of tube 88 as measured across line terminals 87, 87' and resistance 94, is low enough to permit the tube plate to conduct.

Resistor 95 and variable potentiometer 96 serve as bias control.

Electrolytic condenser 97 is used to produce holding voltage for the filament of tube 88. Low voltage battery 98 serves as filament supply. The current is limited by neon indicator line 99 and series resistor 100. Neon indicator line 99 is used to show that the B+ supply is normal. Switches 101 and 101' respectively operate filament and B+ lines.

Relay armature 102 is shunted by an A. C. suppressor circuit for arc quenching.

Coil 104 of A. C. relay 105 operates when tube 88 conducts and relay 92 closes. This will light up A. C. power indicator lamp 106 and place an A. C. line voltage on sockets 107. A. C. armature 108 of relay 105, while closing the circuit of line 106, makes sockets 107 useable as outlets to operate the driving motor of any type of recording or any other monitoring or line equipment.

Network 109 represents a radio frequency filter of conventional design. Lines 110 represent the connection terminals to a standard 115 volt A. C. distribution system.

Fig. 5 represents a line bridging circuit having output terminals 111 permitting connection to the head of a recorder 111' and having input terminals 112 connected to input terminals 87, 87' or to any other terminals of the line to be monitored.

In Fig. 5 there are two series blocking condensers 113 and a unit of two variable series potentiometers 114 adapted to operate in accordance with this invention simultaneously as volume limiters and as charge and line controls.

In this way the charging rate of series blocking condensers 113 will be slowed down. The risk of clicks or pulses being returned to the line will be reduced if not practically eliminated.

Transformer 115 serves to match the relatively low input impedance across terminals 112 to the relatively high impedance of output circuit 111, if required, to replace the microphone used in the recording machine by the recording head.

In Fig. 5 there are two preferably shielded oscillator and converter tubes 116, 117 controlling two oscillation circuits 118, 119. Oscillation circuits 118, 119 contain center tap slug-tuned oscillator coils 120, 121 and are substantially identical except that circuit 119 is tuned to a frequency, say 1,545 megacycles, which is different from that of oscillation circuit 120 which is tuned to 2 megacycles. The circuits employed are standard Hartley oscillators.

Condenser 124 acts as plate to grid coupling capacity.

Transformer 125 serves as an intermediate frequency modulator with a special winding to produce a very sharply curved, narrow band width. The beat frequency is placed at say 455 kilocycles.

Transformer 125 is connected over crystal detector 126, radio frequency by-pass filter 127 and sensitivity controlling potentiometer 128 to the control grid of vacuum triode 129, and over resistance 130 to one control grid of twin-triode type glow discharge tube 130' serving as a "tuning eye." The other control grid of 130' is connected to the plate associated with the first control grid.

Plate resistor 131A connects to B+.

Cathode output circuit of tube 129 contains variable control resistors 131, 132, and ammeter 133 of say 200 microamperes and 2,000 ohm internal resistance, and a series resistor 134 adjustable by switch 135.

Resistor 136 acts as cathode bias resistance and resistor 137 as plate load resistance of vacuum tube 129. Output signal is taken off terminals 140, 141 over condensers 142, 143 which are so set as to allow the oscillations to heterodyne. Any disturbance in the capacity of the telephone line which is being monitored, will cause the beat oscillations to stop.

The device of Fig. 6 has been designed for the purpose of detecting whether the telephone line is being tampered with; it is operated in the following manner:

Pick-up terminals 140, 141 are connected to the telephone line in series with blocking condensers 142, 143 of selected value. Condensers 142, 143 are used to keep the D. C. line voltage from entering the input circuit. Also, they are used to adjust the free running oscillator to a condition of heterodyning and by so doing balance the line capacity and circuit capacity for a zero reading on the indicating instrument. The telephone line must not be in use when the above alignment procedure is taking place, as any changes in the line will affect the alignment, and in turn would immediately show up on the meter.

Under normal—untampered—conditions therefore, a telephone line will allow oscillators 116, 117 to heterodyne with a predetermined frequency. In this case the optimum interstage frequency of 455 kilocycles is detected by crystal detector 126 and fed through radio frequency filter 127 to sensitivity or gain control 128. By varying this gain control 128, the voltage fed to the grid of amplifier tubes 129, 130 is varied. The signal polarity of the detected signal from intermediate frequency transformer 125 is maintained negative and it appears as a negative bias across gain control 128.

If any capacitance is introduced into the telephone line, and thereby into the oscillator circuits 118, 119 connected with the line through terminals 140, 141, the beat oscillation frequency will decrease and the output of filter 127 will be reduced which in turn will cause the negative bias of tube 129 to drop off. Since the signal thus produced also operates tube 129 which serves to amplify the current meter circuit 133, any line disturbance will be visually indicated.

The signal also operates tuning eye tube 130' permitting additional and visual control of a zero beat condition.

Fig. 7 shows specially designed portable power supply means for a detecting device such as shown in Fig. 5 of portable type. The power supply contains several sections such as a power supply filter schematically indicated at 144, a heater filter indicated at 145, a rectifier circuit 146 and a voltage regulator also operating as ripple filter at 147.

A. C. supply terminals 148 are connected over switch 149, fuse 150 and a fuse indicating shunt circuit including neon lamp 151 and series limiting resistor 152 in each line to filter network 153 which serves to prevent any of the signals generated in the unit from entering the power line, and conversely to prevent signals and noise from entering the unit from the power line.

There is a separate filament transformer 154 feeding filaments 155, 156 and 157 respectively of "tuning eye," oscillator and amplifier tubes of Fig. 5 over circuit filters schematically indicated at 158, 159 respectively.

The main power transformer 160 has several low voltage taps 161, 162 for the heaters or any other low voltage applications required for the purpose of the invention.

Device 163 presents a thermo delay relay of the vacuum type causing a delay of say 30 seconds of the B+ voltage application which is connected on the one side of twin rectifier tube 164 to center tapped winding 165 of transformer 160 and which is also connected on the other side over fuse 166 and neon indicator shunt circuit 167, electrolytic filter condenser 168, smoothing choke 169, capacity shunt 170, filter condenser 171 to the anode of amplifier tube 172 and therefrom over screen resistor 173 to regulator tube 174 and over plate resistor 175 to a neon glow lamp 176 of the large and relatively stable type.

By-pass condenser 177 prevents neon lamp 176 from oscillating.

Condenser 178 serves as a ripple by-pass condenser and for feed back.

Resistor 179 serves as control grid series drop resistance for tube 172 and resistor 180 serves as plate load resistance for tube 174.

Divider network 181 serves as circuit load and condenser 182 as output by-pass filter.

In the phantom circuit of Fig. 8 transformer 183 has a primary bridged by loading resistor 184 to prevent the B+ voltage from charging condenser 185.

If a dialing device, not shown but of otherwise well known construction, is applied to terminals 186, it produces a constant short in this circuit.

When this short is placed in the circuit by the dial device over resistor 187, it reduces the pulse voltage originating from battery 188 to say 1.2 volts. When the dial device is in an open position, this voltage will rise to, say 44 volts.

Resistors 188 and 189 serve: to load the circuit so as to approach the actual line impedance; to limit the current flow through transformer 183 to the return line; and to allow condenser 185 to charge due to the short placed in the circuit by the dialing contacts and over series loading resistor 187.

Condenser 185 plays an important part in this pulse generating system.

The short circuit across terminals 186, which reduces the voltage 1.2 volts is removed by dialing. During short-circuiting, condenser 185 is positively charged and turns negative when the dial device opens or the short is removed. A pulse results which causes a 44.5 volt charge of condenser 185 through the primary winding of transformer 183. The condenser charged in one direction sets up an induced voltage of a reversed polarity when the transformer field collapses.

This will cause a potential of reversed polarity to be impressed on condenser 185. The entire action takes place so rapidly that the effect of an A. C. voltage is produced.

Battery 188 may be replaced by a rectifier or any other D. C. supply of say 44.5 volts.

In order that the secondary of transformer 183 be properly loaded resistor 184 should have a relatively high resistance say 50,000 ohms. This replaces the tube impedance and circuit loading. Condenser 190 absorbs and by-passes the generated pulse to ground. This will prevent the pulse from entering the B+ line. Switch 191 serves to disconnect the phantom circuit from the dial device.

The invention is not limited to the circuit elements and circuit connections shown and described but can be applied with more or less equivalent effect to any appropriate type of circuit and circuit connections without departing from the scope of this disclosure.

I claim:

1. In a connection device for telephone lines, terminal means for connecting to at least one of said lines, charge receiving and retarding means effectively bridging said terminal means, said charge retarding means being adjustable to also permit regulation of the audio content derived from said telephone line, audio modulated means for transceiving a carrier frequency substantially above audio range, and means including an inductive radio frequency coupling for selectively connecting said transceiving means through said charge receiving and retarding means to said terminal means.

2. Device according to claim 1 comprising impedance means in series with at least part of said inductive coupling.

3. Device according to claim 1 wherein said inductive coupling includes two inductances coupled inductively to each other; one inductance forming part of a tuning circuit coupled to said transceiving means and the other inductance coupled across said terminal means in series with impedance means.

4. Device according to claim 1 wherein said transceiving means include oscillating and amplifying elements and means for switching over said elements from transmission to reception and conversely, there being also provided other terminal means for connecting to another telephone line and switching means for permitting selectively monitoring of one telephone line and transceiving on another telephone line.

5. Device according to claim 1 wherein said transceiving means include common oscillating and amplifying elements and means for switching over said elements from transmission to reception and conversely; there being also provided other terminal means for connecting to said same telephone line and switching means for permitting selectively monitoring and transceiving on said same telephone line.

6. In a checking device for telephone lines, a pair of input terminals for connecting to at least one of said telephone lines, adjustable load means coupled to said input terminals, a pair of oscillating circuits, one of said oscillating circuits being connected to said adjustable load means and having a frequency controlled by the capacity of said telephone line and said adjustable load means, and the other of said oscillating circuits being coupled to said first oscillating circuit and having a fixed frequency, said two oscillating circuits being adapted to oscillate at different frequencies capable of beating with each other; means for beating said frequencies, and means for utilizing the beat frequency including means under the control of the beat frequency for indicating the condition of said telephone line.

7. Device according to claim 6 wherein said two circuits are capacitively coupled.

8. Device according to claim 6 comprising common power supply means for said oscillating frequency beating and utilizing means; said power supply means including high and low voltage filter means.

References Cited in the file of this patent

UNITED STATES PATENTS

| | | |
|---|---|---|
| 1,691,269 | Crocker | Nov. 13, 1928 |
| 2,228,673 | Reeves | Jan. 14, 1941 |
| 2,340,159 | Thompson | Jan. 25, 1944 |
| 2,399,682 | Kucera | Mar. 7, 1946 |
| 2,604,544 | Dillon | July 22, 1952 |
| 2,655,565 | Thompson | Oct. 15, 1953 |

OTHER REFERENCES

War Dept. Technical Manual TM 11–2016, Multiline Observing Equipment, ADW–BM–100, dated Aug. 29, 1944, pp. 4, 25, 33.